United States Patent [19]

Yoshio

[11] Patent Number: 4,736,354

[45] Date of Patent: Apr. 5, 1988

[54] FOCUS SERVO DEVICE FOR DETECTING AND COMPENSATING FOR DISK ABNORMALITIES

[75] Inventor: Junichi Yoshio, Saitama, Japan

[73] Assignee: Pioneer Electronic Corporation, Tokyo, Japan

[21] Appl. No.: 85,269

[22] Filed: Aug. 12, 1987

Related U.S. Application Data

[63] Continuation of Ser. No. 797,551, Nov. 13, 1985, abandoned.

[30] Foreign Application Priority Data

Nov. 13, 1984 [JP] Japan ................................ 59-237571

[51] Int. Cl.⁴ ................................................ G11B 7/095

[52] U.S. Cl. ........................................ 369/45; 369/44; 369/46

[58] Field of Search ........................ 369/44, 46, 45, 54, 369/58

[56] References Cited

U.S. PATENT DOCUMENTS 4,414,655 11/1983 Shoji et al. ............................ 369/46

4,506,149 3/1985 Utsumi .................................. 369/46

FOREIGN PATENT DOCUMENTS 2132338 7/1984 United Kingdom .

*Primary Examiner*—Raymond F. Cardillo

*Assistant Examiner*—Hoa T. Nguyen

*Attorney, Agent, or Firm*—Sughrue, Mion, Zinn, Macpeak and Seas

[57] ABSTRACT

A focus servo device in which loop gain is reduced in response to detected abnormalities in a recorded disk, in order to prevent interference with a tracking servo device in an optical disk player.

3 Claims, 3 Drawing Sheets

TRACKING ERROR SIGNAL

FOCUS ERROR SIGNAL

FIG. 1
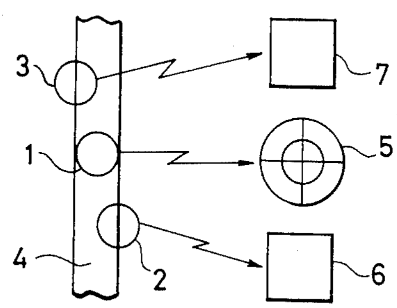
FIG. 3A
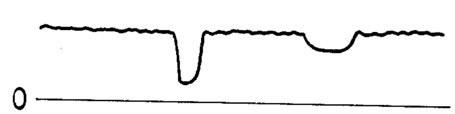
FIG. 3B
0
FIG. 4
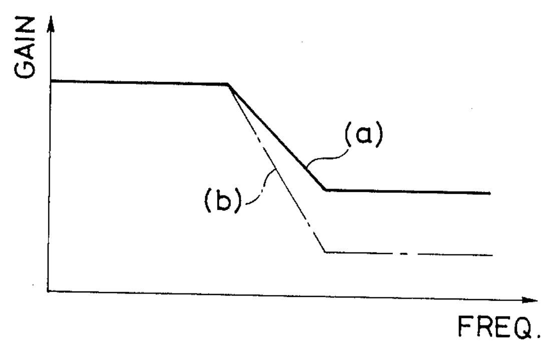

TRACKING ERROR SIGNAL
FOCUS ERROR SIGNAL
+V
-V
VR

FOCUS SERVO DEVICE FOR DETECTING AND COMPENSATING FOR DISK ABNORMALITIES

This is a continuation of application Ser. No. 797,551, filed Nov. 13, 1985, now abandoned.

The present invention generally relates to a focus servo device, and particularly to a focus servo device in an optical information reader for optically reading out information recorded on a recording disk.

BACKGROUND OF THE INVENTION

In an optical information reader for reading out information recorded on a digital audio disk, a video disk, or the like, rotational driving of a recording disk is controlled by a spindle servo device, and recorded information is read out by a pickup movably provided on the disk in the radial direction thereof. Further, there are provided a focus servo device in which control is performed for correctly converging an information detecting spotlight from the pickup on a recording surface of the disk, and a tracking servo device in which control is peformed for causing the spotlight to track a recording track, for example, spirally formed on the recording surface of the disk. In the tracking servo device, the higher the loop gain, the higher the trackability (a capability of following a track) of the information detecting spotlight so that a malfunction such as so-called track jumping is not caused even if there are external vibrations, or if the disk has substantially eccentricity (i.e. is not perfectly round.) As a result, stable tracking control becomes possible.

However, in information readers having these kinds of servo devices, it is possible that an abnormal portion such as a defect, a scar, or the like, on the recording surface of the disk can cause distortion of an error signal of the servo system, resulting in a malfunction such as track jumping or the like when the information reading spotlight from the pickup tracks the recording track at the abnormal portion.

To solve this problem, it has been proposed that in a tracking servo device, when an abnormal portion is detected on the recording surface, a servo operation be performed with a reduced loop gain or with an immediately preceding error value, or alternatively that a servo operation is to be performed instead on the basis of a tracking error signal independent of the abnormal point obtained by another way, thereby obtaining a stable tracking operation without causing any malfunction such as track jumping due to a defect, such as a scar, on the recording surface.

As to reading of the recorded information at the abnormal portion such as a defect or a scar, on the recording surface, on the other hand, when drop-outs due to a defect, a scar, or the like are detected, a drop-out compensation circuit (not shown) prevents the recorded information from being produced so that it is unnecessary to perform particular control onto a focus servo device for an abnormal portion on the recording surface.

However, experiments by the inventors have shown that disturbance in a focus servo system due to a defect such as a scar as described above in turn disturbs a tracking servo system. That is, when a defect is detected on a recording surface of a disk, a sufficiently stable tracking operation cannot be performed unless the tracking servo system is controlled in addition to controlling the focus servo system.

SUMMARY OF THE INVENTION

The present invention is attained in view of the foregoing disadvantages, and an object of the present invention is to provide a focus servo device in which it is made possible to improve the trackability of an information detecting spotlight in the case where there exists an abnormal portion on a recording surface of a disk.

The focus servo device according to the present invention is featured in that an abnormality on the disk recording surface is detected on the basis of a signal level of an output signal from a pickup, and a loop gain is reduced in a predetermined frequency band within a servo zone in response to a detection output of the abnormality.

The focus servo device according to the present invention is further featured in that, when an abnormality on the disk recording surface is detected, the loop gain is reduced in a predetermined frequency band within the servo zone and phase compensation is performed in the frequency band.

BRIEF DESCRIPTION OF THE DRAWINGS

FIG. 1 shows the positional relationship among three spotlights on the recording track;

FIG. 3A is a waveform diagram showing a focus error signal in the vicinity of an abnormal portion on the disk recording surface, and FIG. 3B shows a shaped output signal thereof;

FIG. 4 shows a gain characteristic set by the gain setting circuit of FIG. 2;

DETAILED DESCRIPTION OF THE PREFERRED EMBODIMENTS

Figure 2:
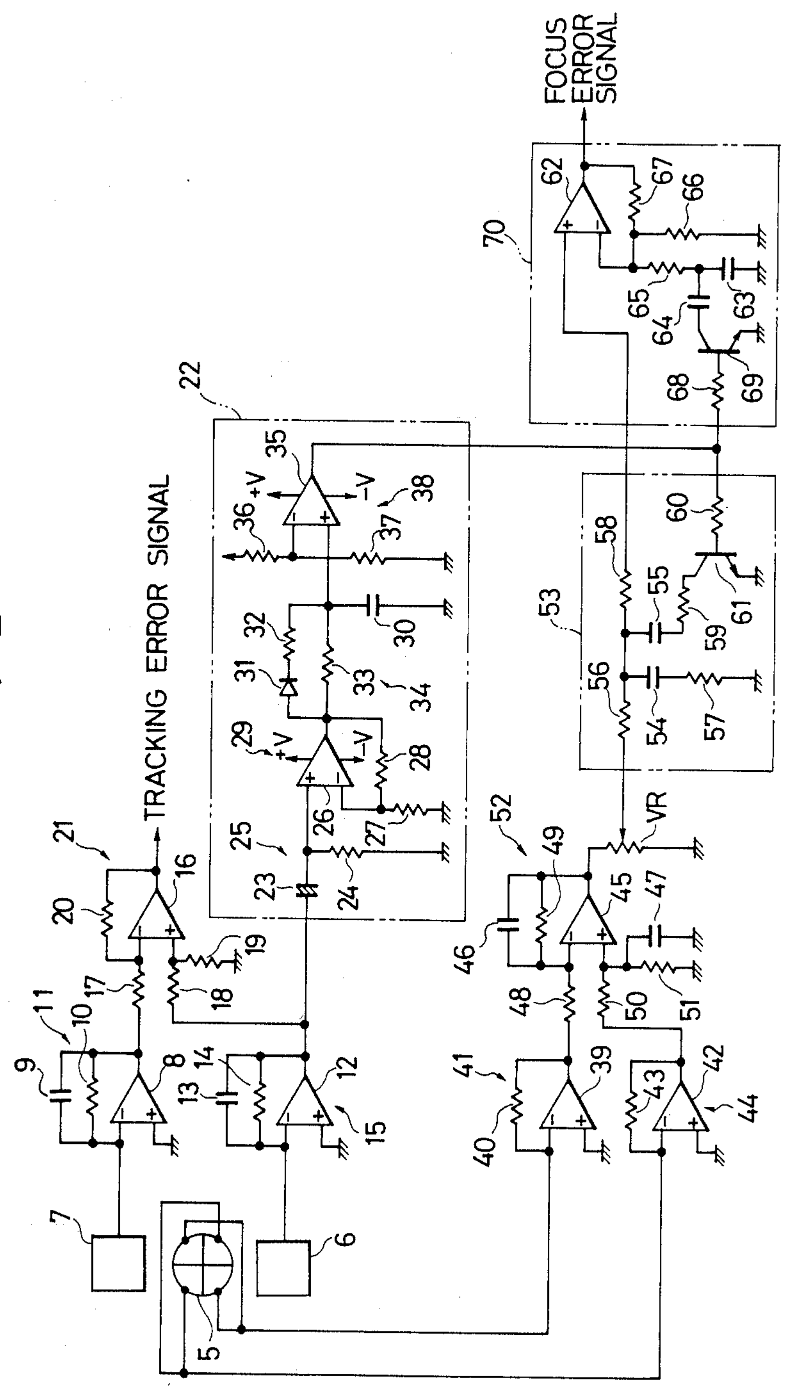
FIG. 2 is a circuit diagram showing an embodiment according to the present invention.

Referring to the drawings, an embodiment according to the present invention will be described in detail hereunder.

In FIG. 1, three spotlights which are obtained by converging respective laser beams, that is, a recorded-information detecting spotlight 1 and a pair of tracking information detecting spotlights 2 and 3 respectively preceding and succeeding the spotlight 1 when the spotlight 1 moves relative to a disk, are irradiated on a recording track 4 on the disk in the illustrated positional relationship. That is, the pair of tracking information detecting spotlights 2 and 3 are positioned on both side edges of the track 4 respectively when the recorded information detecting spotlight 1 is positioned on a center line of the track 4. Therefore, when the recorded-information detecting spotlight 1 deviates from the center line of the track 4 in the direction perpendicular to the track 4 (in the radial direction of the disk), a difference in quantity of light between the reflected light beams of the pair of tracking information detecting spotlights 2 and 3 corresponds to the direction and quantity of the deviation of the spotlight 1. The respective reflected light beams of the spot 1, 2 and 3 are entered into photoelectric transducer elements 5, 6 and 7 which are contained in a pickup (not shown).

In FIG. 2, the respective reflected light beams of the tracking information detecting spotlights 2 and 3 enter the respective photoelectric transducer elements 6 and 7 and are transduced into electric signals which are in turn supplied to a subtractor 21 respectively through waveform shaping circuits 11 and 15, the subtractor comprising an operational amplifier 16 and resistors 17–20, the waveform shaping circuit 11 comprising an operation amplifier 8, a capacitor 9, and a resistor 10, the waveform shaping circuit 15 comprising an operational amplifier 12, a capacitor 13, and a resistor 14. A signal is formed in the subtractor 21 in accordance with a difference in level between the respective outputs of the phtoelectric transducer elements 6 and 7 and is produced as a tracking error signal.

The output signal of the photoelectric transducer element 6 which receives the reflected light of the preceding spotlight 2 is supplied also to an abnormality detecting circuit 22 through the waveform shaping circuit 15. The abnormality detecting circuit 22 is provided for detecting abnormalities on a disk recording surface in accordance with the level of the output signal of the photoelectric transducer element 6 after being shaped by the waveform shaping circuit 15 when there is an abnormal portion on the disk recording surface when the disk is reproduced.

The abnormality detecting circuit 22 is constituted by an AC coupling circuit 25 comprising a capacitor 23 and a resistor 24; an amplifier 29 comprising a capacitor 23 and a resistor 24; an amplifier 29 comprising an operational amplifier 26 and resistors 27 and 28; a time constant circuit 34 comprising a capacitor 30, a diode 31, a charging resistor 32, and a discharging resistor 33; and a comparator 38 comprising an operational amplifier 35 and voltage dividing resistors 36 and 37.

The reflected light of the recorded information detecting spotlight 1 (see FIG. 1) enters the photoelectric transducer element 5 through a cylindrical lens (not shown). With respect to the cylindrical lens, a position on an optical axis of the lens where the luminous flux is converged, is different between the case where the luminous flux transmits a surface containing a generatrix of the lens and the case where the luminous flux transmits a surface perpendicular to the first-mentioned surface, so that the shape of the luminous flux projected on a light receiving surface of the photelectric transducer elements 5 varies depending on the positional relation between the recording surface of the disk and the convergent point of the laser beam. In order to make it possible to detect the variation in shape of the luminous flux projected on the light receiving surface of the photoelectric transducer element 5, the photoelectric transducer element 5 is arranged such that the light receiving surface thereof is divided into four independent light receiving subelements by two perpendicular lines.

The addition of the respective outputs of a pair of diagonally disposed subelements of the photoelectric transducer 5 and the addition of the respective outputs of another pair of diagonally disposed subelements of the same are supplied to a subtractor 52 comprising an operational amplifier 45, capacitors 46 and 47, and resistors 48 to 51, respectively through an amplifier 41 comprising an operational amplifier 39 and a resistor 40, and an amplifier 44 constituted by an operational amplifier 42 and a resistor 43. The output signal of the subtractor 52 representing the direction and quantity of deviation of the convergent point of the laser beam is produced as a focus error signal. Further, if the respective output signals of the amplifiers 41 and 44 are added to each other, an RF signal, which is a recorded-information read-out signal is obtained.

The focus error signal is supplied to a gain setting circuit 53 for setting a gain of a servo loop through a variable resistor VR. The gain setting circuit 53 comprises, for example, capacitors 54 and 55, resistors 56 to 60, and a transistor 61. The transistor 61 functions as a switching means which is turned on by a high level of the detection output supplied from the foregoing abnormality detecting circuit 22. When the transistor 61 is turned on, the loop gain in a high frequency band within a servo zone is reduced.

The focus error signal derived from the gain setting circuit 53 is supplied to a phase compensating circuit 70 which performs phase compensation for the supplied signal. The phase compensating circuit 70 is constituted by an operational amplifier 62, capacitors 63 and 64, resistors 65 to 68, and a transistor 69. The transistors 69 functions as a switching means which is turned on by a high level of the detection output supplied from the foregoing abnormality detecting circuit 22, so that phase compensation is performed in the high frequency band in which the loop gain is reduced by the gain setting circuit 53, in response to the turning-on of the transistor 69.

Next, the operation of the circuits of the focus servo device according to the present invention will be described.

First, in this embodiment, in the information reader using a so-called tracking error signal producing system of the three-beam type, an abnormal portion on the disk recording surface is detected only on the basis of the output of the photoelectric transducer element 6 which receives the reflected light of the preceding tracking information detecting spotlight 2.

That is, since the signal level of the output signal of the photoelectric transducer element 6 is reduced, as shown in FIG. 3(A), in accordance with the degree of the abnormal state on the disk recording surface, the output signal is supplied to the abnormality detecting circuit 22 after being shaped by the waveform shaping circuit 15 as shown in FIG. 3(B), so that the abnormality is detected by the circuit 22 on the basis of the change in signal level.

The output signal of the photoelectric transducer element 6 supplied to the abnormality circuit 22 through an AC-coupling comprising the capacitor 23 and resistor 24 is amplified by the amplifier 29 and time-extended by the time constant circuit 34. This is because, when an abnormality is detected on the basis of the preceding tracking information detecting spotlight 2, it is necessary to maintain the detected abnormal state until the succeeding tracking information detecting spotlight 3 has passed through the abnormal portion. Specifically, the charging resistor 32 is selected to have an exceedingly small resistance value R32 in comparison with a resistance value R33 of the discharging resistor 33 (R33>>R32), so that the capacitor 30 is rapidly charged through the diode 31. As a result, no delay results in the abnormality detecting operation when the capacitor 30 is charged, while the operation of discharging the capacitor is performed in accordance with the time constant determined by the capacitor 30 and the discharging resistor 33 to thereby extend discharging time when the capacitor 30 is discharged. The level of the output signal of the time constant circuit 34 is compared with a reference level given by the voltage-divider resistors 36 and 37 in the comparator 38 and the thus obtained comparison output is used as an abnormality detection output.

In the gain setting circuit t3, the transistor 61 is turned on in response to the abnormality detection output from the abnormality detecting circuit 22, thereby effecting a series connection of the capacitor 54 and the resistor 57 in parallel with a series connection of the capacitor 55 and the resistor 59, thereby reducing the loop gain in the high-frequency band within the servo zone. That is, in the gain setting circuit 53, although the loop gain is reduced in the high-frequency band as shown by the solid line (a) in FIG. 4, it is further reduced as shown by the one-dotted chain line (b) in FIG. 4 upon detection of the abnormality. At the same time, in the phase compensating circuit 70, the transistor 69 also is turned on in response to the abnormality detection output from the abnormality detecting circuit 22 to thereby connect the capacitors 64 and 63 in series with each other, and a compensating zone is set in the low-frequency band in accordance with the reduction in loop gain by the gain setting circuit 53, thereby performing the phase compensation suitable for the frequency band.

Thus, when the disk is reproduced in which there is an abnormal portion on the recording surface, the loop gain control, etc., is performed also in the focus servo system so that disturbance in the focus servo system caused by the abnormality on the disk recording surface does not disturb the tracking servo system. Thus, it is possible to improve the trackability of an information detecting point, that is the recorded-information detecting spotlight 1, of the pickup with respect to the abnormal portion on the disk recording surface in comparison with the conventional case where the loop gain control has been performed only in the tracking servo system.

Although the abnormality on the disk recording surface is detected in accordance with the preceding tracking information detecting spotlight 2 in the embodiment described above, the detection may be, alternatively, performed on the basis of the tracking error signal produced by the subtractor 21 of FIG. 2.

Figure 5A:
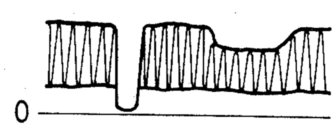
FIG. 5A is a waveform diagram showing a reproducing RF signal.
Figure 5B:
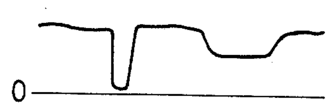
FIG. 5B shows an envelope detecting output thereof.
Figure 5C:
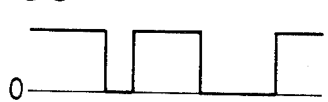
FIG. 5C shows a shaped output thereof.
Figure 6:
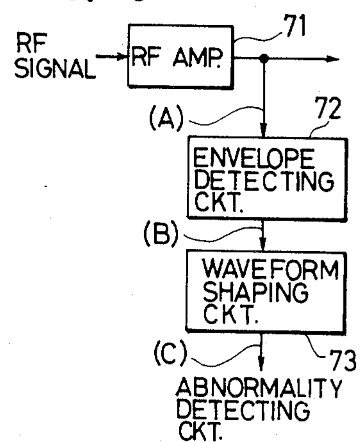
FIG. 6 is a diagram showing a circuit for performing the waveform processing as shown in FIG. 5.

Further, it is also possible to detect an abnormality on the disk recording surface on the basis of the RF signal obtained by adding the respective output signals of the amplifiers 41 and 44 to each other. That is, since the signal level of the RF signal is reduced in accordance with the degree of the abnormal state on the disk recording surface as shown in FIG. 5A, it is possible to detect an abnormality on the disk recording surface so that, in the circuit shown in FIG. 6, the envelope of an RF signal A derived from an RF amplifier 71 is detected by an envelope detecting circuit 72 so as to remove a changing component (an AC component) of the RF signal level, the ouput signal B of the envelope detecting circuit 72 is shaped by a waveform shaping circuit 73, and the output C of the waveform shaping circuit 73 is supplied to the abnormality detecting circuit 22.

Figure 7A:
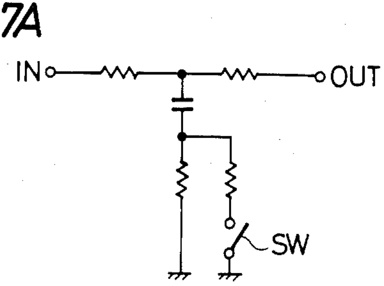
FIGS. 7A, 7B, and 7C show three modifications of the gain setting circuit of FIG. 2.
Figure 8A:
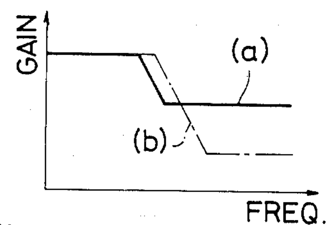
FIGS. 8A, 8B, and 8C show gain characteristics of the corresponding circuit arrangements in FIGS. 7A–7C.
Figure 7B:
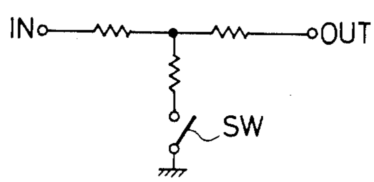
Figure 8B:
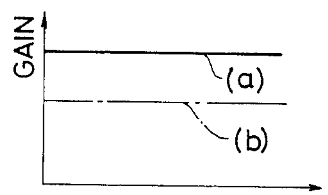
Figure 7C:
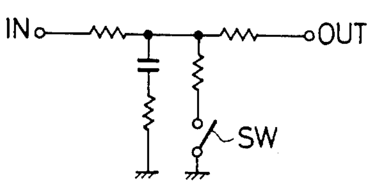
Figure 8C:
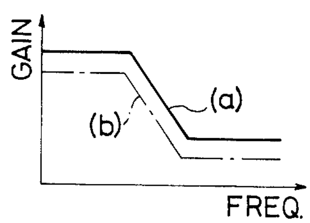

Further, although the loop gain is reduced in the high-frequency band within the servo zone by the circuit arrangement of the gain setting circuit 53 as shown in FIG. 2 in the embodiment as described above, it is possible, alternatively, to reduce the gain in the high-frequency band with the circuit arrangement shown in FIG. 7A when an abnormality on the disk recording surface is detected. Further, it is possible uniformly to reduce the gain all over the servo zone with one of such circuits shown in FIGS. 7B and 7C. FIGS. 8A–8C show gain characteristics corresponding to the circuit arrangements in FIGS. 7A–7C. In each of the gain characteristics shown in FIGS. 8A–8C, a solid line (a) represents the gain characteristic when the disk is ordinarily operated, while a one-dotted chain line (b) represents the gain characteristic when an abnormality on the disk recording surface is detected. Further, in FIGS. 7A–7C, a switch SW corresponds to the transistor 61 of FIG. 2.

As described above, according to the focus servo device of the present invention, in the case where there exists an abnormal portion such as a defect or a scar, on the disk recording surface, control is performed also on the focus servo system so that disturbance in the focus servo system caused by the abnormality on the disk recording surface does not disturb the tracking servo system. Thus, the trackability of an information detecting point of the pickup with respect to the abnormal portion on the disk recording surface can be improved in comparison with the conventional case where the loop gain control has been performed only in the tracking servo system.

What is claimed is:

1. In an apparatus for reproducing recorded information, including a pickup for reproducing information recorded on a recorded disk, and a tracking servo device for maintaining said pickup within a recorded track on said disk, a focus servo device in which a spotlight irradiated from said pickup is controlled in accordance with a focus error signal so as to correctly converge said spotlight on a recording surface of said disk, whrein said pickup includes a single recorded-information detecting spotlight and a pair of tracking information detecting spotlights respectively preceding and succeeding said single recorded-information detecting spotlight when said recorded-informating detecting spotlight moves relative to said recording disk, said focus servo device comprising abnormality detecting means for detecting abnormalities on said recording surface in accordance with a level of output signals of said preceding tracking information detecting spotlight, wherein said abnormality detecting means holds a detected abnormality output for a predetermined time after disappearance of said output signals, and gain setting means for setting a gain of a servo loop, said gain setting means reducing the loop gain in a predetermined frequency band within a servo zone in response to said detected abnormality output from said abnormality detecting means, said focus servo device prevening said abnormalities from affecting said tracking servo device.

2. A focus servo device according to claim 1, further comprising phase compensating means for performing phase compensation of said focus error signal, said phase compensating means changing over a compensating band in accordance with said predetermined frequency band where the loop gain is reduced by said gain setting means in response to said detection output.

3. A focus servo device according to claim 1, further comprising means, responsive to reflected outputs of said preceding and succeeding tracking information detecting spotlights, for outputting a tracking error signal, said abnormality detecting means producing a detecting output in response to said tracking error signal.

* * * * *